United States Patent [19]
Konecny et al.

[11] Patent Number: 5,909,098
[45] Date of Patent: Jun. 1, 1999

[54] DOWNHOLE PUMPING SYSTEM WITH VARIABLE SPEED PULSE-WIDTH MODULATED INVERTER COUPLED TO ELECTRICAL MOTOR VIA NON-GAP TRANSFORMER

[75] Inventors: Karl Frank Konecny, Tigard; Allan Barr Plunkett, Sherwood, both of Oreg.; Kelly Ray Packard, Bartlesville, Okla.; Jacqueline Rae Akerson, Powell, Wyo.

[73] Assignee: Reda Pump, Bartlesville, Okla.

[21] Appl. No.: 08/995,712

[22] Filed: Dec. 22, 1997

Related U.S. Application Data

[63] Continuation of application No. 08/643,128, May 2, 1996, Pat. No. 5,844,397.

[51] Int. Cl.⁶ .......................................................... A02P 5/28
[52] U.S. Cl. .......................................... 318/811; 318/813
[58] Field of Search .................................... 318/798–815, 318/727

[56] References Cited

U.S. PATENT DOCUMENTS

| | | | |
|---|---|---|---|
| 3,876,923 | 4/1975 | Humphrey et al. | 363/71 |
| 3,984,752 | 10/1976 | Akamatsu et al. | 363/138 |
| 4,159,513 | 6/1979 | Gemp et al. | 363/43 |
| 4,327,314 | 4/1982 | Hosokawa et al. | 318/722 |
| 4,415,846 | 11/1983 | Dewan | 318/732 |
| 4,437,051 | 3/1984 | Muto et al. | 318/808 |
| 4,456,868 | 6/1984 | Yamamura et al. | 318/800 |
| 4,459,534 | 7/1984 | Nagase et al. | 318/808 |
| 4,484,128 | 11/1984 | Jotten et al. | 318/805 |
| 4,503,375 | 3/1985 | Okuyama | 318/802 |
| 4,503,376 | 3/1985 | Okuyama | 318/802 |
| 4,509,003 | 4/1985 | Ohnishi et al. | 318/800 |
| 4,510,430 | 4/1985 | Ashikaga et al. | 318/800 |
| 4,545,464 | 10/1985 | Nomura . | |
| 4,558,269 | 12/1985 | Ishida et al. | 318/811 |
| 4,559,485 | 12/1985 | Stephan | 318/802 |
| 4,611,158 | 9/1986 | Nagase et al. | 318/803 |
| 4,617,675 | 10/1986 | Ashikaga . | |
| 4,628,475 | 12/1986 | Azusawa et al. | 364/851 |
| 4,651,068 | 3/1987 | Meshkat-Razavi | 318/254 |
| 4,663,702 | 5/1987 | Tanaka | 363/65 |

*Primary Examiner*—David Martin
*Attorney, Agent, or Firm*—Arnold, White & Durkee

[57] ABSTRACT

An improved downhole pumping system that employs a variable speed PWM inverter and a non-gap transformer to drive an induction motor over a range of different speeds, without saturating the transformer. The variable speed PWM inverter provides a rectangular PWM signal that may be varied according to inputs from a controller to adjust the speed of the motor. The PWM inverter is electrically connected to the transformer, and the transformer is electrically attached to the motor via cables, which may be lengthy in downhole applications. The motor may be started by ramping flux producing current to a first preset value at a low frequency, then ramping torque producing current to a second preset value. If a flux measurement indicates the motor has stalled, the second preset value is increased, and the routine is restarted. Otherwise, if no stall has occurred, the motor's speed is ramped to the desired value. Ongoing operation of the motor is managed by a drive routine, which generates triangular and sinusoidal signals based upon a desired chopping frequency, as well as a desired driving frequency of the motor. A sine-triangle comparison is performed upon these signals to yield three rectangular PWM signals, which are used to control the inverter.

12 Claims, 8 Drawing Sheets

DOWNHOLE PUMPING SYSTEM WITH VARIABLE SPEED PULSE-WIDTH MODULATED INVERTER COUPLED TO ELECTRICAL MOTOR VIA NON-GAP TRANSFORMER

This is a continuation of application Ser. No. 08/643,128 filed May 2, 1996 now U.S. Pat. No. 5,844,3997.

BACKGROUND OF INVENTION

1. Field of Invention

The present invention relates to an improved downhole pumping system utilizing an electric motor. More particularly, the invention concerns a system for extracting fluids from a well by using an induction motor coupled to a variable speed pulsewidth modulated (PWM) inverter via a non-gap transformer.

2. Description of Related Art

Induction motors are widely used today for a variety of different functions, including a substantial number of industrial purposes. In fact, induction motors are used nearly exclusively in tasks requiring electric motors, except in low horsepower applications. For example, induction motors have been used with considerable success in downhole drilling applications, such as deep well pumping operations. When used in the oil field, induction motors provide many advantages, such as their low cost, low power requirements, and low maintenance needs.

In some applications, induction motors receive electrical power in the form of a "line voltage" received directly from a power line of an electrical power company. Although this arrangement is beneficial in many cases, it has several drawbacks. For instance, when an induction motor is directly connected to the power line, the motor operates at one speed, in response to the frequency and amplitude of the line voltage. In downhole pumping applications, this will result in the motor pumping oil at a single rate. If multiple speed pumping is desired, this arrangement may be inadequate.

High levels of current are another problem that might be encountered when an induction motor is directly connected to a power line. In particular, when an induction motor is started, high levels of current are often required. Therefore, one must ensure that the power lines are able to supply the required starting current. In many cases, power lines with high current capacity are more expensive, since the cost of electrical service is typically related to the maximum number of amps to be supplied.

As a result of these limitations, many have installed variable speed drives between the power line and the induction motor. Typically, the variable speed drive and a drive controller of a selected type are operatively connected between the power line and a transformer. The transformer is utilized to drive the motor, and more particularly to step up the level of voltage and reduce the current supplied to the motor. This is especially important in applications such as downhole pumping operations, where a long cable connects the transformer to the motor; in these situations, the transformer helps prevent excessive current from flowing in the long cable. The variable speed drive provides more flexibility in controlling the motor's speed. One example of such a drive is a "six-step drive," which operates by providing a square wave of variable frequency and amplitude.

Six step drives still have a number of problems, however. For example, a six step drive will often produce high harmonic losses in the motor that it drives. In addition, a six step drive is more likely to damage a motor. As can be shown by Fourier analysis, a square wave is made up of multiple sinusoids of different frequencies. Accordingly, since each electrical motor is vulnerable to electrical signals of a particular frequency, a six-step drive is more likely to produce that particular frequency, and damage the motor, particularly during starting, when the fundamental frequency is low. This effect is especially important in downhole pumping applications, since long, thin, downhole pumping motors are more likely than other configurations to exhibit torsional resonance.

Figure 1:
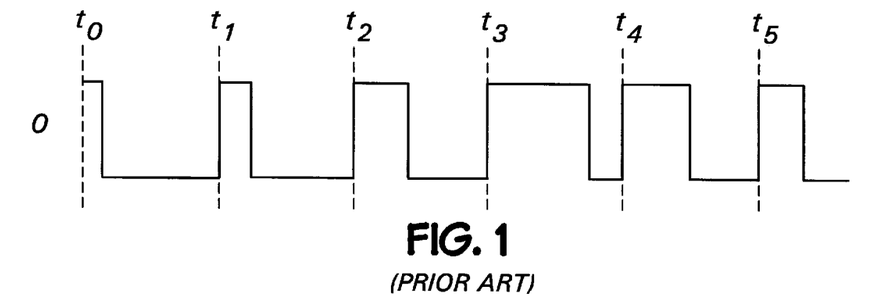
FIG. 1 is a graph of a rectangular voltage signal created by a known PWM drive.
Figure 2:
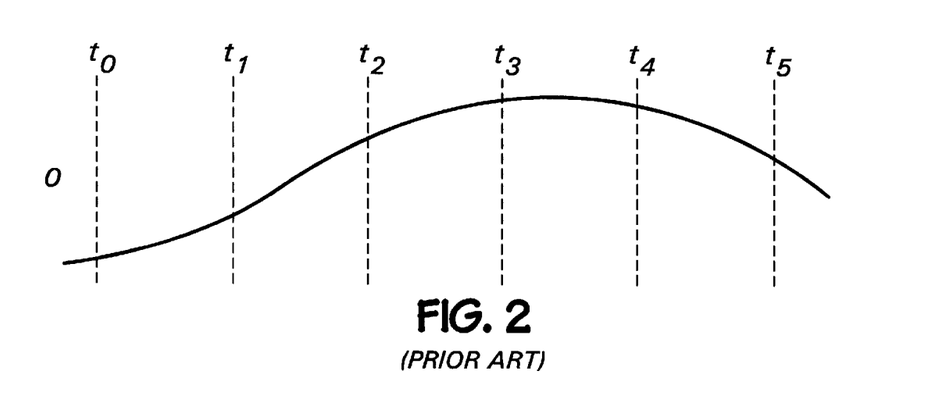
FIG. 2 is a graph of a sinusoidal voltage signal that is equivalent to the rectangular signal of FIG. 1.

In contrast to six-step drives, another approach is the pulsewidth modulated (PWM) drive. Like a six-step drive, a PWM drive is operatively connected between a power line and a transformer that drives a motor. However, unlike a six-step drive, a PWM drive generates a rectangular voltage signal having a variable on-time (FIG. 1), to simulate an equivalent sinusoidal signal (FIG. 2); the equivalent sinusoidal signal may represent the electrical driving frequency ($f_\omega$) of the motor. The frequency of the PWM voltage signal ($f_{PWM}$), called the "chopping frequency," is typically constant.

Figure 3:
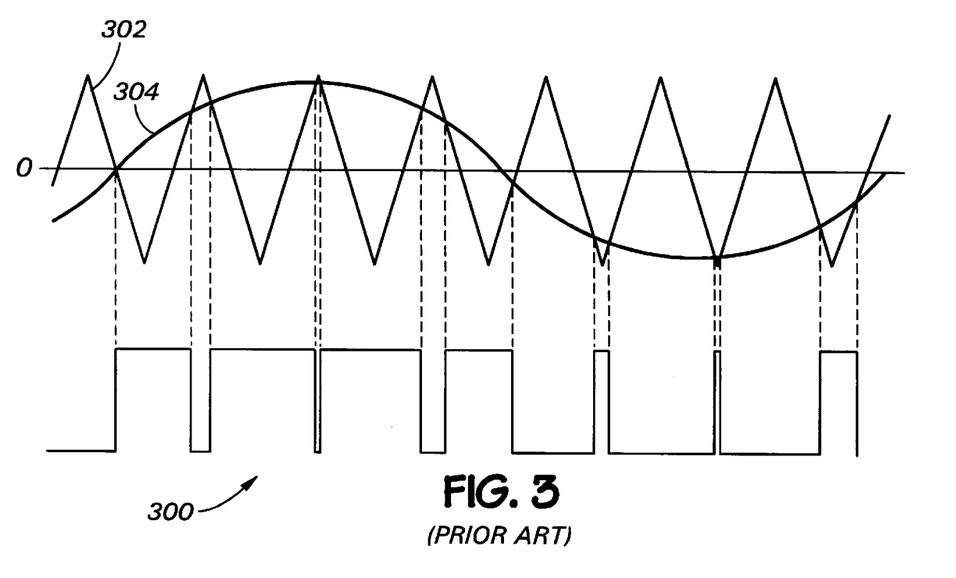
FIG. 3 is a graph illustrating the known "sine-triangle" method for generating a rectangular PWM signal.

One approach that is used to develop rectangular voltage signals for PWM drives is the "sine-triangle" scheme. As shown in FIG. 3, this method designates high and low periods of a rectangular voltage signal 301 based upon the intersection between a triangular wave 302 having the desired chopping frequency ($f_{PWM}$), and a sinusoidal signal 304 having the desired electrical driving frequency of the motor ($f_\omega$). The rectangular signal 300 is (1) high when the sinusoidal signal 304 is greater than the triangular wave 302, and (2) low when the sinusoidal signal 304 is less than the triangular wave 302.

With PWM drives, then, a scheme such as the sine-triangle scheme is used to determine the pattern with which the PWM drive will apply power to the motor. To further define how power is applied to the motor, some systems use "vector control" technology. Vector control technology facilitates direct control over the motor's flux and torque. In particular, vector control technology represents flux and torque as vector quantities having perpendicular "Q" and "D" components. Therefore, torque is expressed as shown in Equations 1 and 2 (below). The "α" symbol is used to designate "proportional to."

$$\text{torque } \alpha \text{ flux}_D \cdot \text{current}_Q - \text{flux}_Q \cdot \text{current}_D \quad [1]$$

$$\text{torque } \alpha \ \Phi_D \cdot I_Q - \Phi_Q \cdot I_D \quad [2]$$

$I_D$ is called "flux producing current" and $I_Q$ is called "torque producing current." By utilizing a rotating reference frame, $\Phi_Q$ may be maintained at zero, reducing Equation 2 to Equation 3 (below).

$$\text{torque } \alpha \ \Phi_D \cdot I_Q \quad [3]$$

Thus, one benefit of vector control technology is that it facilitates independent control of flux producing current and torque producing current. Another benefit of vector control technology is its improved damping of mechanical resonances in the motor. Vector control theory is explained more completely in Blaschke's treatise, entitled "Das Prinzip der Feldorientierung, die Grundlage fur transvector-Regulung von Drehfeldmachinen," Siemens Zeitschrift, Vol. 45 (1970), pp. 757–760.

Figure 4:
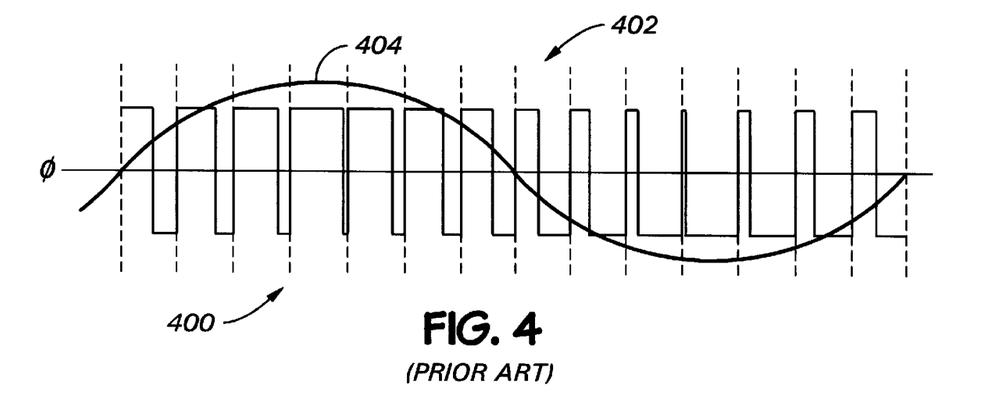
FIG. 4 is a graph of an uneven rectangular voltage signal 400, 402 and the equivalent sinusoidal voltage signal 404 created by a known PWM drive.
Figure 5:
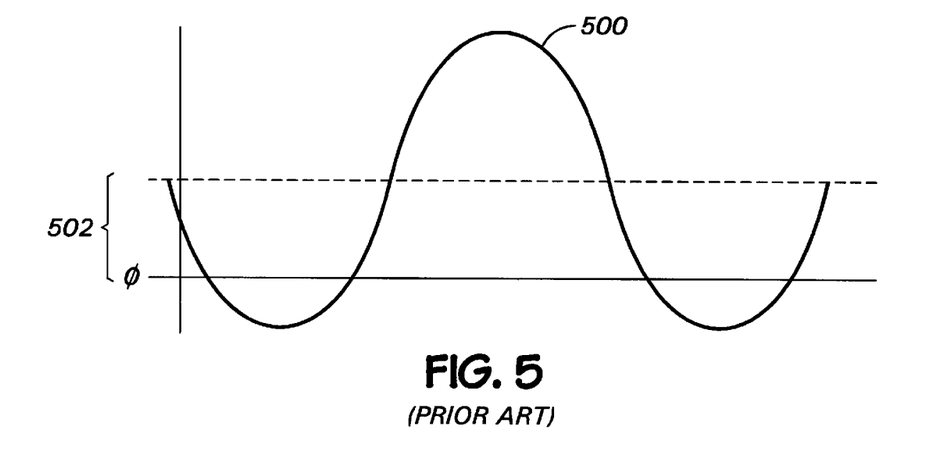
FIG. 5 is a graph of a current signal 500 produced by directing the voltage signal 400, 402 into a transformer.

Although PWM drives provide a number of benefits, such as avoiding the potentially damaging harmonic frequencies generated by six step drives, conventional PWM drives may present certain problems in some applications. One problem is that PWM drives generate direct current (D.C.) offsets due to slight switching time biases and a beat-like phenomenon between the fundamental frequency and the chopping frequency. These small offsets will saturate a non-gapped transformer. In particular, if the total on-time of the positive rectangular voltage signals 400 (FIG. 4) is not equal to the on-time of the negative rectangular voltage signals 402, the sinusoidal equivalent signal 404 will be uneven, and a current signal 500 (FIG. 5) having a D.C. offset 502 will be created.

This condition may easily occur when the sine-triangle scheme is used. Specifically, since the triangular wave 302 and the sinusoidal signal 304 may be asynchronous, the positive and negative on-times of the rectangular signal 300 are not necessarily equal. As a result, the sinusoidal equivalent of the rectangular wave 300 may be non-symmetrical, resulting in a D.C. offset current. Therefore, although the sine-triangle approach may be adequate for driving a motor with a gapped transformer, or for directly driving the motor, this approach is limited when used to drive a motor via a non-gap transformer. Thus, in applications where a transformer must be used with a PWM drive, such as in downhole applications, the transformer must be a gapped transformer, even though non-gapped transformers are much less expensive.

One problem with variable speed drives, both six-step and PWM, is that they often have difficulty in starting highly loaded motors. This predicament is especially likely to arise in downhole pumping applications, where motors sometimes become stuck, and consequently highly loaded. Variable speed drives typically use a "constant-volts-per-Hz" relationship between applied frequency and voltage. While this scheme may drive the motor properly at high speeds, it does not perform well at startup; in some cases, a motor may not start, resulting in thermal damage to the motor, due to prolonged high current without self-pumping cooling.

BRIEF SUMMARY OF INVENTION

The present invention concerns an improved downhole pumping system that employs a variable speed PWM inverter and a non-gap transformer to drive an induction motor over a range of different speeds. In an illustrative embodiment, the invention includes a rectifier, a smoothing circuit, and an inverter that provides a three phase signal to the motor via a non-gap transformer. The inverter provides a PWM signal that may be varied according to inputs from a controller to adjust the speed of the motor. The non-gap transformer is electrically interposed between the inverter and one or more cables that are connected to the motor. In downhole applications, the cables may be lengthy.

The motor may be started according to a unique "startup" routine of the invention. Flux producing current is ramped at low frequency to a first preset value and torque producing current is ramped to a second preset value. Flux is measured to assist in determining the motor's mechanical speed. If the motor has stalled, the second preset value is increased, and the routine is restarted. Otherwise, if no stall has occurred, the motor's speed is ramped to the desired level.

A novel "drive" routine is utilized to direct the ongoing operation of the motor. The drive routine receives the desired chopping frequency ($f_{PWM}$) of the motor, and the motor's electrical driving frequency ($f_\omega$). Calculations are performed to identify an acceptable frequency $f_{TRI}$, nearest to the desired $f_{PWM}$, that will yield a balanced PWM signal. Then, a triangular wave with the identified $f_{TRI}$ is generated, and three sinusoidal signals with frequency $f\omega$ are generated. A sine-triangle comparison of these signals is performed to produce three rectangular wave PWM signals, and these signals are used to control the inverter. By generating balanced PWM signals, saturation of the non-gap transformer is avoided.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 6:
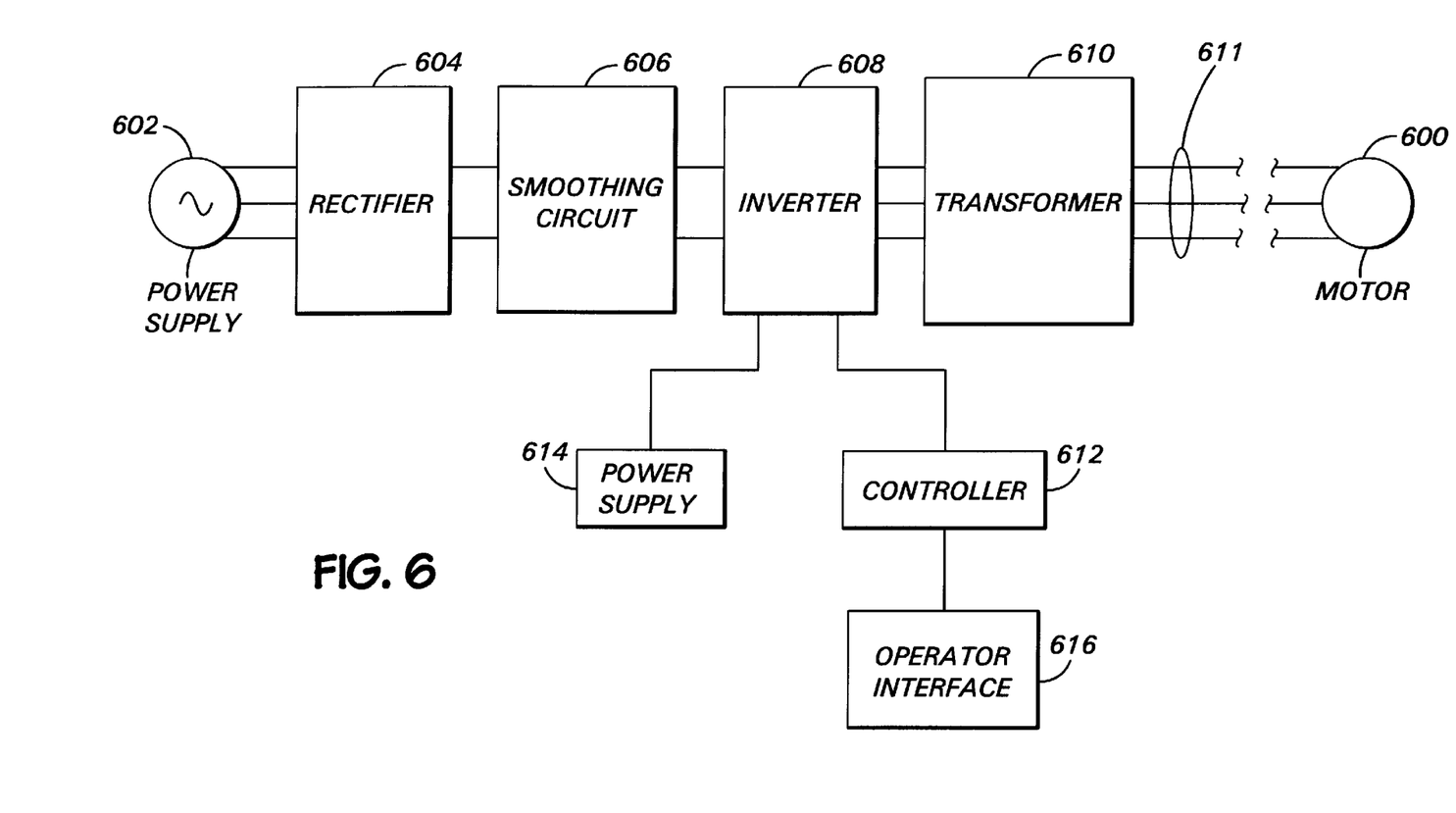
FIG. 6 is a block diagram of the hardware components and interconnections of the present invention.

The invention includes a number of hardware components and interconnections, which are generally described in FIG. 6. Basically, the invention selectively provides electrical power to an induction motor 600. Since an induction motor is an asynchronous machine, its speed depends upon the frequency of the alternating current (A.C.) voltage applied to it, less any mechanical slip. Accordingly, the invention generally operates to rectify three phase, fixed frequency line voltage into D.C. voltage, and invert it back into A.C. power having a desired frequency for operating the motor 600.

The invention receives electrical power from a three phase power supply 602 (FIG. 6). Preferably, the power supply 602 provides an A.C. voltage waveform of about 380 or 480 A.C. volts (RMS), with a frequency of 50–60 Hz. The power supply 602 is electrically connected to a three phase full-wave rectifier 604, which receives the waveform provided by the power supply 602 and converts it into D.C. voltage. The rectifier 604 provides a D.C. voltage of about 537 or 680 volts, depending upon whether the voltage of the power supply 602 is 380 or 480 A.C. volts, respectively. The rectifier 604 is electrically connected to a smoothing circuit 606, which eliminates ripples in the voltage provided by the rectifier 604.

An inverter 608 receives the smoothed D.C. signal from the smoothing circuit 606 and provides a three phase signal to the motor 600 via a transformer 610. The inverter 608 provides a PWM signal, which may be varied according to inputs from a controller 612, thereby adjusting the frequency of rotation of the motor 600. The transformer 610 comprises a primary (not shown) coupled to a secondary (not shown) via an iron core, in a configuration known to those skilled in the art. Preferably, the primary is delta-connected and the secondary is wye-connected, although other arrangements may be utilized. The transformer 610 is electrically interposed between the inverter 608 and cables 611 that are connected to the motor 600. When the motor 600 is used in downhole pumping operations, the cables 611 will typically be about 6,000 feet in length, but may be between 1,000 and 10,000 feet long in some applications.

The controller 612 manages the inverter 608, to effectively control the amplitude and frequency of the signals provided to the transformer 610. In an illustrative embodiment, the controller 612 may comprise a microprocessor such as an Intel® model 80196. An inverter power supply 614 is also electrically connected to the inverter 608. The inverter power supply 614 provides electrical power to various sub-components (not shown) of the inverter 608, as described in greater detail below. The invention also includes an operator interface 616, electrically connected to the controller 612. The operator interface 616 permits a user of the invention to select parameters for operating the motor 600, to receive status and fault information, to generate computer printouts, to start or stop the motor 600, and the like.

Figure 7A:
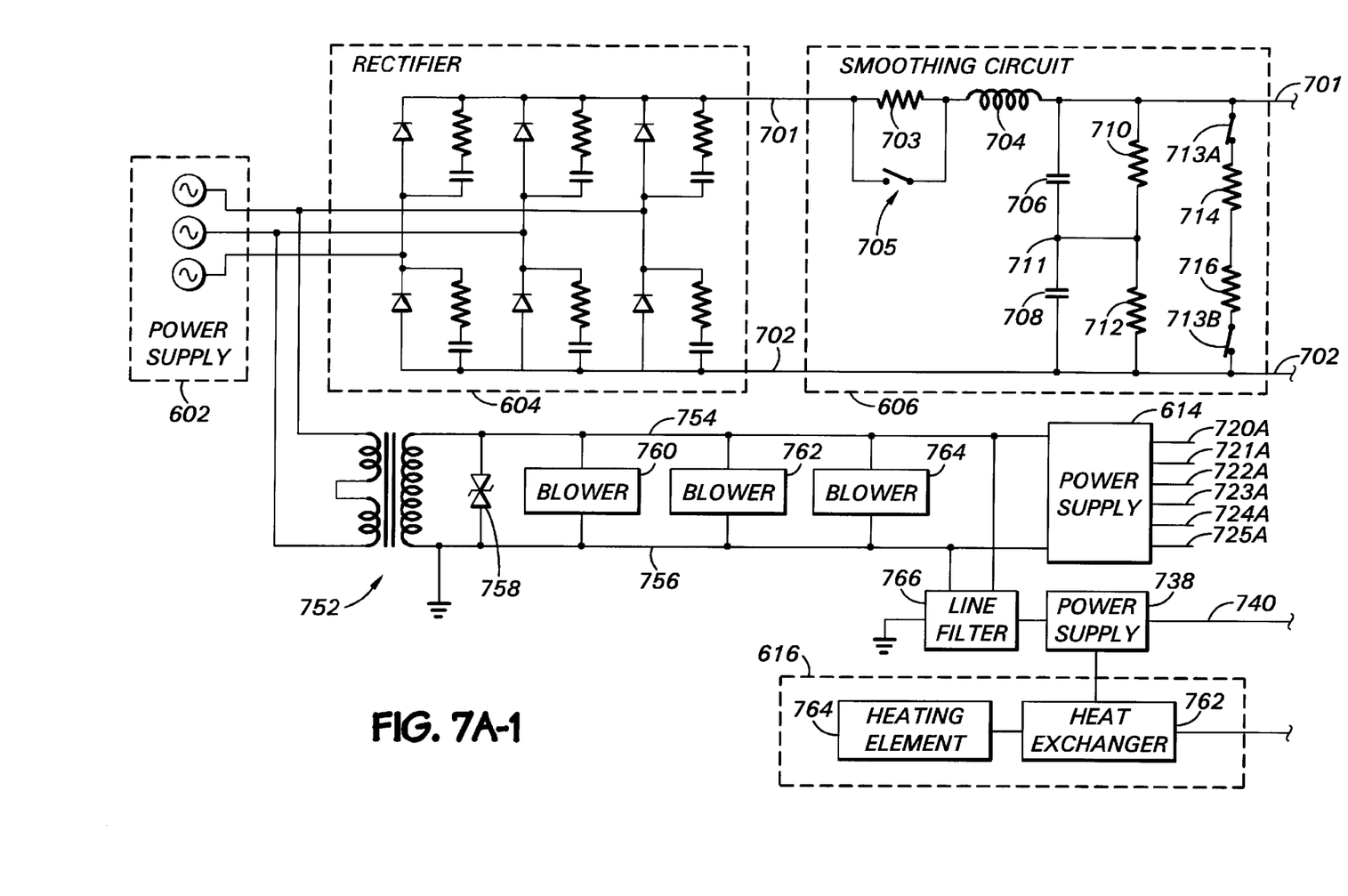
FIG. 7 is a schematic diagram of the hardware components and interconnections of the present invention.
Figure 7A:
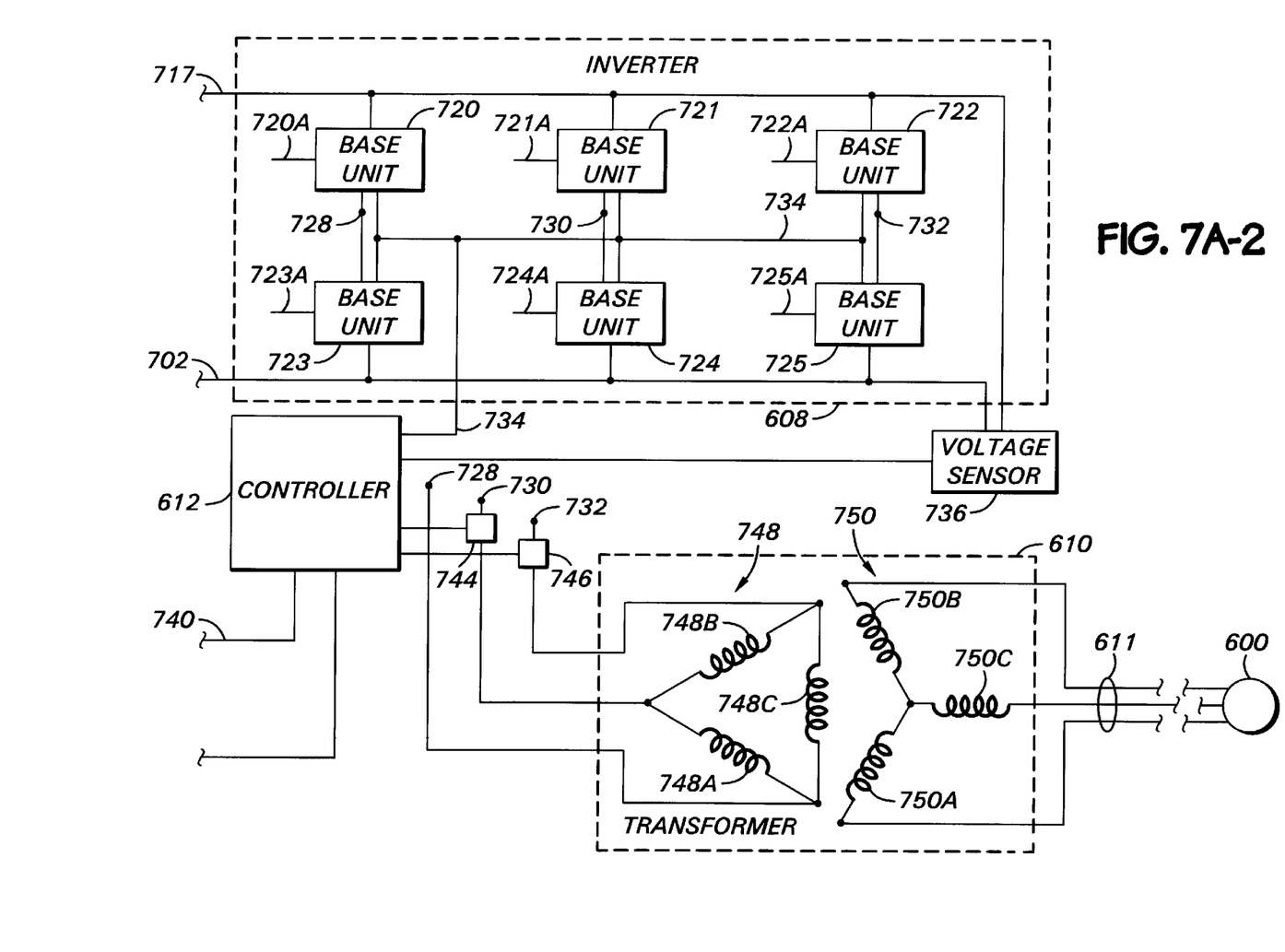
Figure 7B:
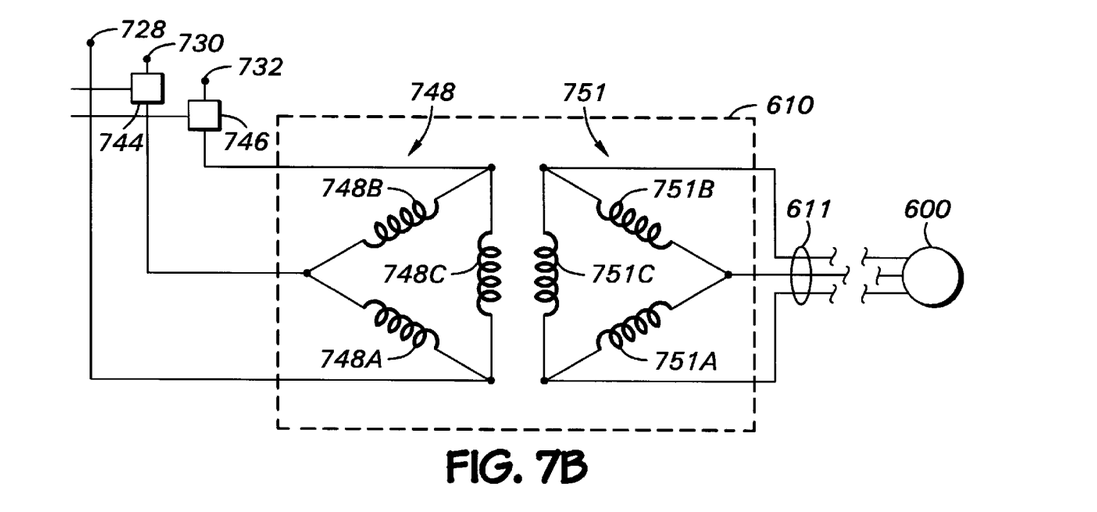

The components of FIG. 6 are illustrated in greater detail in FIG. 7. The three phase power supply 602 is electrically connected to the rectifier 604, which includes a number of diodes, capacitors, and resistors, interconnected as shown in FIG. 7. In an illustrative embodiment, the diodes may comprise Powerex model CD611416 diode modules, the resistors may comprise 10 Ω (25 W) resistors, and the capacitors may comprise 0.25 μF (2000 V) capacitors. The rectifier 604 receives a three phase A.C. signal from the power supply 602 and converts it into a D.C. voltage across a first bus 701 and a second bus 702.

The first bus 701 and second bus 702 are connected to the smoothing circuit 606, which provides a filtered bus 717. The smoothing circuit 606 includes a switchable resistor 703; an inductor 704; a bank of capacitors which may include capacitors 706 and 708; and discharge resistors 710, 712. The resistor 703 is connected in parallel with a switch 705, which is selectively closed several seconds after power is applied to the buses 701, 702. When the switch 705 is open, the resistor 703 limits any turn-on current surge in the capacitors 706, 708. After the capacitors 706, 708 are charged to line voltage, the inductor 704 and the capacitors 706, 708 operate as a line filter, to prevent any transient voltage spikes from appearing on the first bus 717. The capacitors 706, 708 continuously discharge into the discharge resistors 710, 712, which ensure that a node 711 between the capacitors 706, 708 is charged to a predetermined voltage, such as one-half the D.C. bus voltage across the busses 701, 702. A pair of resistors 714, 716 are provided, in series with switches 713*a* and 713*b*. During ongoing operation of the invention, the switches 713*a*–713*b* are open. However, when power is removed from the busses 701, 702, the switches 713*a*–713*b* are closed, to permit the capacitors 706, 708 to safely discharge into the resistors 714, 716.

In an illustrative embodiment, the resistor 703 may comprise a pair of 1 Ω (100 W) resistors in series, and the inductor 704 may comprise a 215 μH inductor. The capacitors 706, 708 may comprise 6800 μF (400 V) electrolytic capacitors, the discharge resistors 710, 712 may comprise 100 KΩ (2 W) resistors, and the discharge resistors 714, 716 may comprise 1 KΩ (160 W) resistor.

The inverter 608 includes six transistor-and-base-drive units 720, 721, 722, 723, 724, and 725. The units 720–722 will be referred to as the "upper" units, and the units 723–725 will be referred to as the "lower" units. The units 720–725 include power supply inputs 720*a*–725*a*, respectively, which are electrically connected to the inverter power supply 614. The units 720–722 are electrically connected to the filtered bus 717, and the units 723–725 are electrically connected to the second bus 702. Furthermore, the units 720 and 723 are interconnected at a node 728; the units 721 and 724 are interconnected at a node 730; and the units 722 and 725 are interconnected at a node 732. The voltage across the buses 701, 702 is sampled by a voltage sensor 736, which is electrically connected to the controller 612. In an illustrative embodiment, the voltage sensor 736 may comprise a resistive divider connected to an analog input channel of the controller 612.

Each of the units 720–725 may exchange information with the controller 612 via a base drive cable 734, which preferably contains six wires (not shown), each wire connecting a different unit 720–725 to a different pin of the controller 612. The base drive cable 734 may include an optically isolated connection to reduce the transmission of noise. The controller 612 receives electrical power from a logic power supply 738 via a line 740. The controller 612 is additionally connected to a pair of current sensors 744, 746. In an exemplary embodiment, the current sensors 744, 746 may comprise LEM model LT-500-S modules.

The transformer 610, in an illustrative embodiment, may comprise a commonly available non-gap transformer, such as a Southwest brand, FACT III series transformer. The transformer 610 includes a primary 748 having windings 748*a*, 748*b*, and 748*c*. The primary 748 is preferably delta-connected, as illustrated herein. The interconnection between the windings 748*a* and 748*c* is electrically connected to the node 728; the interconnection between the windings 748*a* and 748*b* is electrically connected to the node 730 via the current sensor 744; and the interconnection between the windings 748*b* and 748*c* is electrically connected to the node 732 via the current sensor 746. The current sensors 744, 746 measure the current through the windings 748*a*, 748*b*, and 748*c*. These current measurements, along with the voltage measurements from sensor 736, are utilized by the controller 612 to manage the inverter 608 under a vector control algorithm. The primary 748 is electromagnetically coupled with a secondary 750, which has windings 750*a*, 750*b*, and 750*c*. Preferably, the secondary 750 is wye-connected, as illustrated herein, although a delta connection is also contemplated. The windings 750*a*–*c* are electrically connected to the motor 700 via the cables 611.

The electrical hardware of FIG. 7 also includes various accessories. In particular, a transformer 752 is electrically connected to two phases of the power supply 602, and operates to convert the power supply voltage into a waveform of 120 A.C. volts for various purposes, as explained below. In an exemplary embodiment, the transformer may comprise an Acme brand transformer, rated at 2 KVA. The transformer 752 has output busses 754, 756, respectively. A transient suppressor 758 is provided to limit the amplitude of the voltage across the buses 754, 756.

Interposed between the buses 754, 756 are a blower 760, a heat exchanger 762, a heating element 764, and a line filter 766. The blower 760 directs air over a heat sink (not shown) associated with the inverter 608, and may comprise an Aavid model 61785. The heat exchanger 762 operates to remove internal cabinet heat, and, as an example, may comprise a Noren model CC500. The heating element 764 functions to increase the internal cabinet temperature in cold environments, and may comprise a Watlow model EN3751. The line filter 766 provides noise-filtered A.C. to the logic power supply 738, and, in an illustrative embodiment may comprise a Corcom brand filter.

The operator interface 616 includes a central processing unit (C.P.U.) 762 and an interface unit 764. The C.P.U. 762 functions to process data received from the user, and to oversee the interface unit 764. The interface unit 764 may include a display (not shown) and a keypad (not shown) to permit a user to exchange information with the C.P.U. 762. The display may comprise a liquid crystal display (L.C.D.), electro-luminescent (E.L.) display, an array of light emitting diodes (L.E.D.s), or another suitable device for the user to receive visual information.

Figure 8:
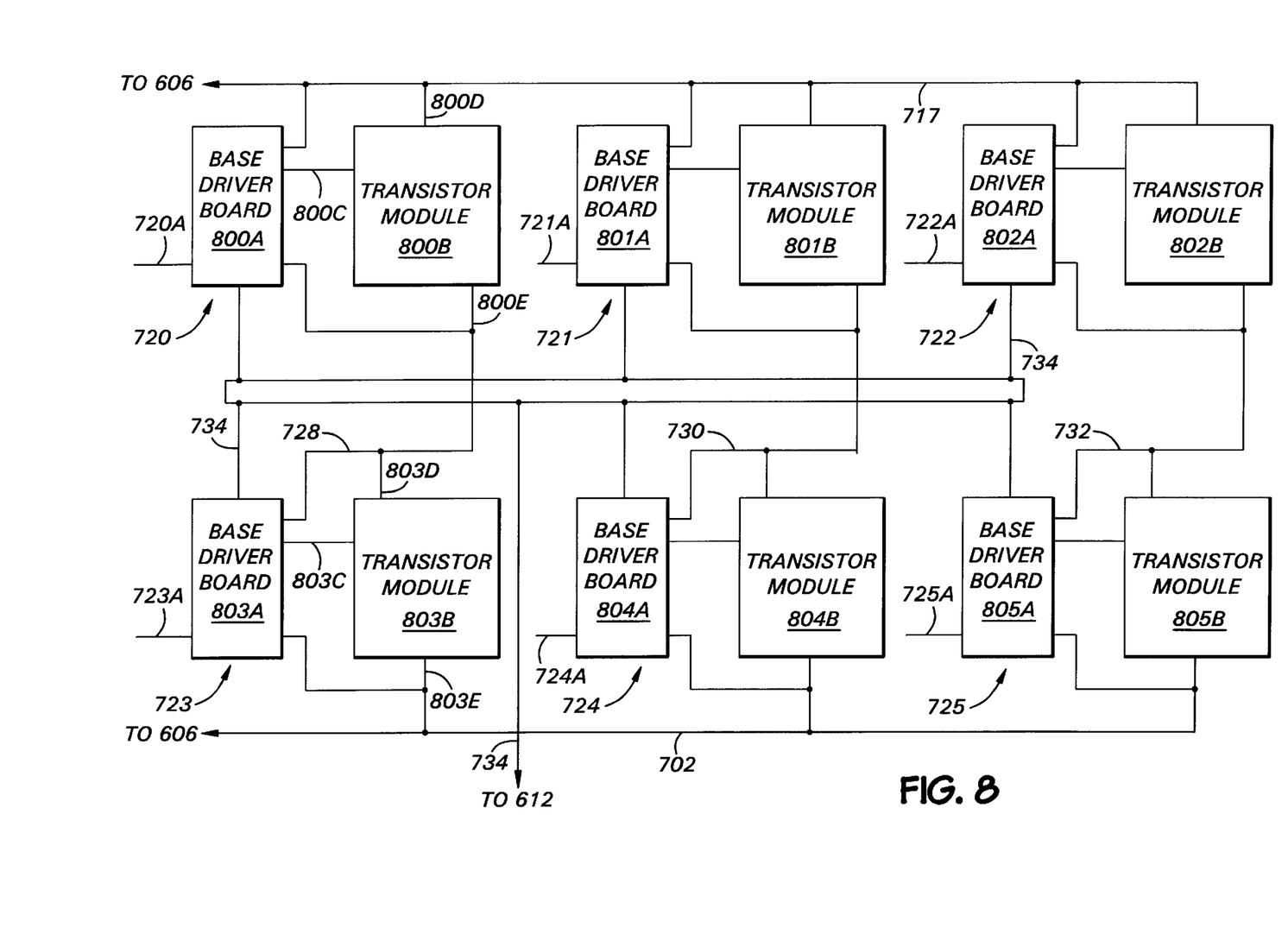
FIG. 8 is a detailed schematic diagram of an inverter 608, in accordance with the present invention.

The inverter 608 contains a number of sub-components (FIG. 8). Each unit 720–725 includes a base driver board and a transistor module. For example, the unit 720 includes a base driver board 800a and a transistor module 800b, having leads 800c, 800d, and 800e. In an exemplary embodiment, the transistor modules 800b–805b may comprise Darlington modules, or insulated gate bipolar transistors (IGBTs). Each of the upper base driver boards 800a–802a is electrically connected to the filtered bus 717, and each of the lower base driver boards 800a–802a is electrically connected to the second bus 702.

The lead 800c is connected to the base driver board 800a, the lead 800d is connected to the filtered bus 717, and the lead 800e is connected to the base driver board 800a as well as the lead 803d of the module 803b. The lead 803c is connected to the base driver board 803a, the lead 803d is connected to the lead 800e of the module 800b, and the lead 800e is connected to the second bus 702. The electrical configurations of the units 720 and 723 are understood to be representative of the electrical configuration of the other upper and lower units, 721–722 and 724–725, respectively.

OPERATION

Figure 9:
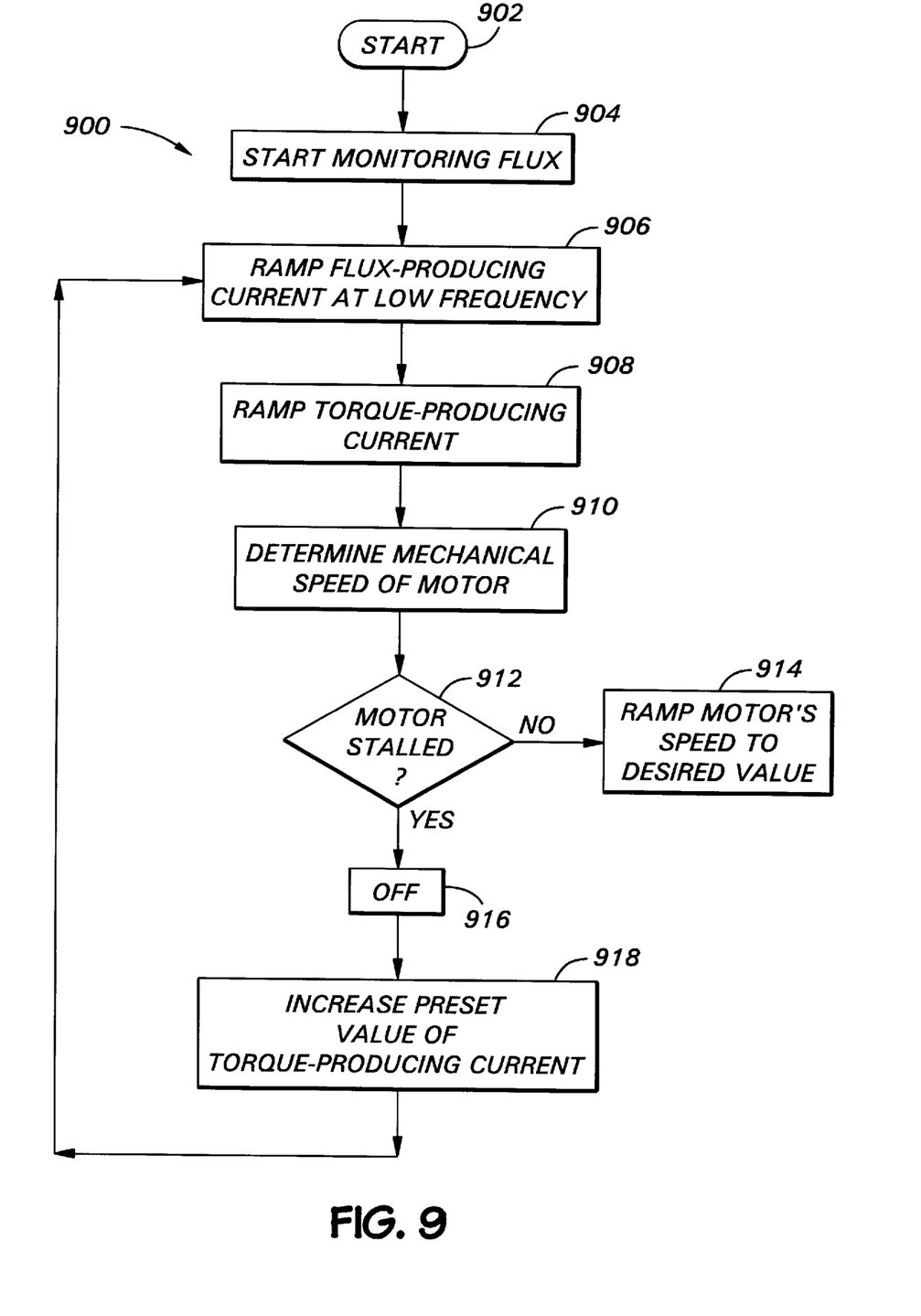
FIG. 9 is a flowchart illustrating a "startup routine" used by the inverter 608 to start an induction motor in accordance with the invention.

The invention operates according to various software routines executed by the controller 612. The motor 600 is started according to the "startup" routine of the invention (FIG. 9), which includes a number of tasks 900. After the startup routine is initiated in task 902, task 904 begins monitoring the flux of the load comprising the transformer 610 and the motor 600. The flux of each winding is obtained by using the current sensors 744, 746 to measure the current through that winding, since the relationship between flux, voltage, and current is known, as shown in Equation 4 (below).

$$V = I \cdot R + L \cdot \frac{dI}{dt} + \frac{d(\text{flux})}{dt} \quad [4]$$

Then, task 906 ramps the flux producing current to a preset value, at a low frequency. In an illustrative embodiment, this frequency may be 2 Hz. Then, task 908 ramps the torque producing current to $I_{q\text{-}init}$, a preset value. Next, task 1110 determines the mechanical speed ($\omega_{moch}$) of the motor 600 using the measured flux, according to Equations 5 and 6 (below).

$$\omega_{moch} = \omega_{elec} - \text{slip} \quad [5]$$

$$\text{slip} = (I_Q \div \Phi_D) \cdot k \quad [6]$$

Then, query 912 asks whether the motor 600 is stalled, by determining whether its mechanical speed ($\omega_{moch}$) is zero. This protects the drive and the motor, since a stationary motor 600 would overheat if current were passing through it. If the motor 600 is not stalled, the controller 612 directs the inverter 608 to ramp the motor's speed to the desired value in task 914.

However, if query 912 determines that the motor is stalled, the controller 612 in task 916 shuts off the motor by discontinuing the inverter 608. Then, task 918 increments $I_{q\text{-}init}$ by a predetermined value, and returns to task 906. Next time task 908 is executed, the torque producing current will be ramped to a higher value, having a higher probability of starting the motor 600. In this way, the controller 612 ensures that the inverter 608 provides sufficient torque for starting the motor 600.

Figure 10:
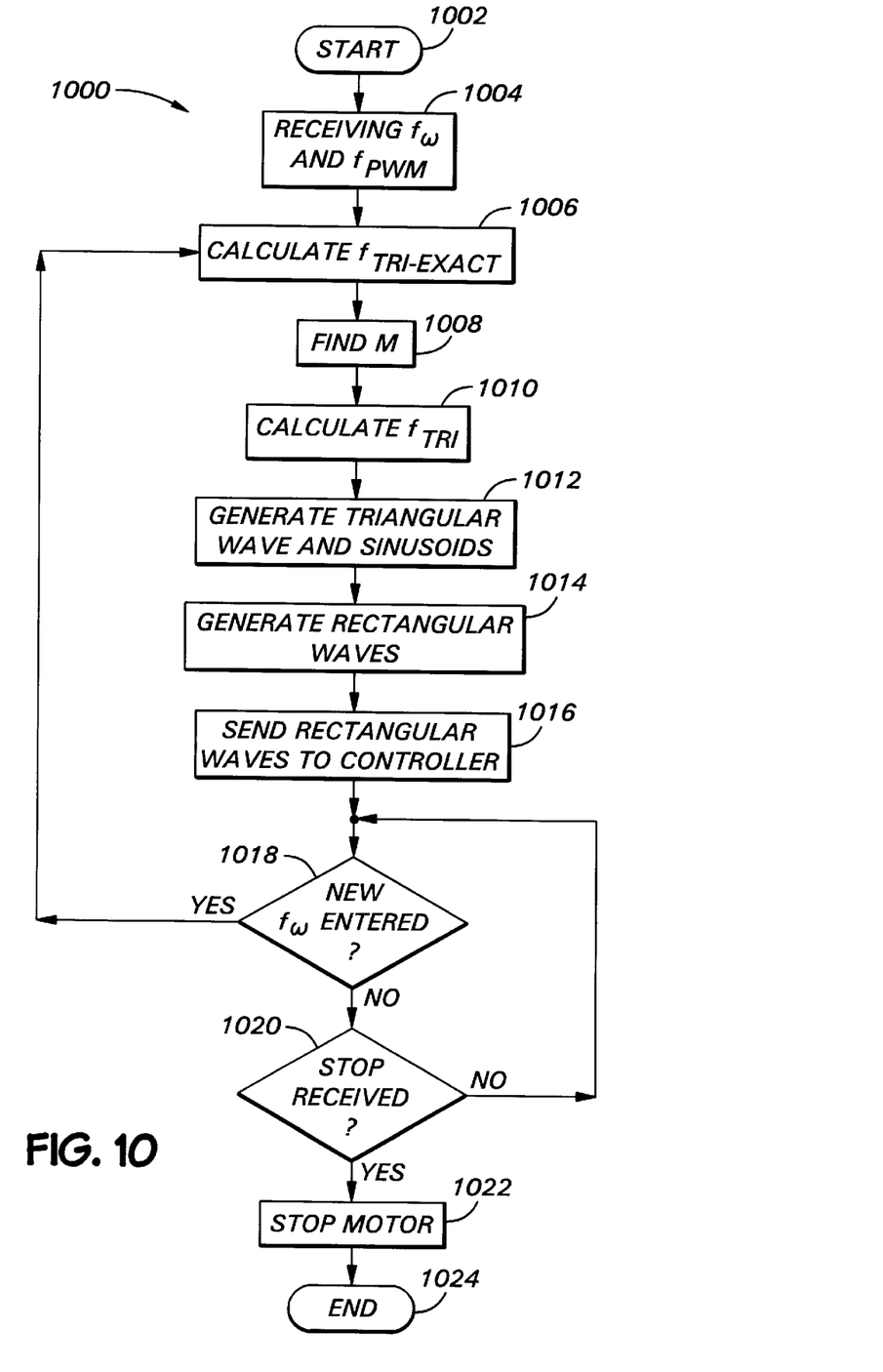
FIG. 10 is a flowchart illustrating a "drive routine" for generating a PWM signal in accordance with the invention.

During the ongoing operation of the motor 600, the controller 612 operates the inverter 608 according to a "drive" routine of the invention (FIG. 10). The drive routine includes a number of tasks 1000, which may be implemented in the controller 612 in the form of "C" language programming lines. After the drive routine starts in task 1002, task 1004 retrieves a desired chopping frequency ($f_{PWM}$) from memory (not shown). This frequency is chosen to minimize heating in the transistors. Task 1004 additionally receives the electrical frequency ($f_\omega$) of a desired speed of rotation of the motor, which may be received from the interface unit /64. Then, task 1006 calculates the exact frequency of the triangular signal ($f_{TRI\text{-}EXACT}$) needed to accomplish the desired chopping frequency and electrical driving frequency, according to Equation 7 (below).

$$f_{TRI\text{-}EXACT} = \frac{1}{3} \cdot \text{integer} ((3 \cdot f_{PWM}) \div f\omega) \quad [7]$$

Then, task 1008 takes the result of Equation 7, and identifies the nearest odd multiple of three (m). For example, if $f_{TRI\text{-}EXACT}$ were 22, the next-higher and next-lower odd multiples of three would be 21 and 27, respectively; accordingly, m would be 21.

Then, task 1010 calculates the frequency of the triangular signal ($f_{TRI}$) using Equation 8 (below).

$$f_{TRI} = f_\omega \cdot m \quad [8]$$

Next, task 1012 generates a triangular signals having a frequency of $f_{TRI}$. Task 1012 also generates three sinusoidal signals having the frequency of $f_\omega$, and separated by a 120° phase difference. Using Equations 7–8 to establish the relationship between $f\omega$ and $f_{TRI}$ ensures that the zero-crossing points of the sinusoidal signals are synchronized with zero-crossing points of the generated triangular signal. In other words, each of the three sinusoidal signals reaches zero at a time when the the triangular signal is also at zero.

Then, task 1014 generates three rectangular signals, by comparing the generated triangular signal with each of the generated sinusoidal signals. In particular, each of the rectangular signals will be high when its respective sinusoidal signal is greater than the triangular signal. Likewise, each of the rectangular signals will be low when its respective sinusoidal signal is less than the triangular signal.

In task 1016, the controller 612 directs these rectangular signals to the inverter 608 in digital form, causing the appropriate units 720–725 to drive the transformer 610 accordingly. The controller 612 continues to provide digital representations of the generated signals to the inverter 608.

However, if query 1018 determines that the user has entered a new desired speed ($f_\omega$), the routine jumps to task 1006, and performs the necessary calculations based upon the new desired speed. If query 1020 determines that the controller 612 has received a "stop" command, the controller 612 stops sending signals to the inverter 608 in task 1022, and the routine ends in task 1024.

CONCLUSION

The present invention offers a number of advantages to its users. For example, in contrast to prior arrangements, the invention permits a variable speed PWM drive to operate an electrical motor via a non-gap transformer. The drive routine of FIG. 10 ensures that the transformer 610 does not saturate due to D.C. offset current. Moreover, the controller 612 may utilize the current sensors 744, 746 to ensure that the current imparted to the motor 600 is within the operating limitations of the motor 600. Furthermore, the invention reduces electrical and mechanical resonance in the motor, since no sub-harmonics or low order harmonics are generated. In addition, the invention achieves improved motor starting, since the vector control routine applies maximum torque to overcome high motor loading and torsional resonance.

While there have been shown what are presently considered to be preferred embodiments of the invention, it will be apparent to those skilled in the art that various changes and modifications can be made herein without departing from the scope of the invention as defined by the appended claims. For example, instead of using the current sensors 744, 746 to measure flux, a speed or position sensor could be used. Also, instead of implementing the controller 612 of the invention with a microprocessor, an ordinarily skilled artisan having the benefit of this disclosure may implement the invention using discrete analog or digital circuitry. Additionally, a "snubber" circuit may be included in the inverter 608 to limit the voltage across the units 720–725. Such a snubber circuit may include a resistor, a diode, and a capacitor, or another arrangement as known in the art. Furthermore, although the present invention is especially useful for pumping oil from oil wells, it is also beneficial for pumping water or other fluids from above or below ground.

What is claimed is:

1. A fluid pumping system, comprising:
   a variable speed pulsewidth modulated drive having a driving frequency $f_\omega$;
   a non-gap three-phase transformer electrically connected to the drive;
   an electric motor; and
   cables interconnecting the motor and the transformer;
   controller circuitry coupled to said pulsewidth modulated drive for providing a three-phase signal thereto, wherein said controller circuitry includes:
   circuitry for determining a ratio between said driving frequency $f_\omega$ and a desired chopping frequency $f_{PWM}$;
   circuitry for identifying an odd multiple of three nearest to said ratio;
   circuitry for generating a triangular signal having a frequency equal to $f_\omega$ times said odd multiple of three;
   circuitry for generating three sinusoidal signals having frequency $f_\omega$ and separated by phase differences of 120 degrees, wherein all zero-crossing points of said three sinusoidal signals occur simultaneously with zero-crossing points of said triangular signal;
   comparison circuitry for performing a sine-triangle comparison of said triangular signal and said three sinusoidal signals to generate first, second and third rectangular signals; and
   driving circuitry for selectively applying said first, second and third rectangular signals to said motor.

2. The system of claim 1, wherein the cables are at least 500 feet long.

3. The system of claim 1, wherein the electrical motor comprises an induction motor.

4. The system of claim 1, further including two current sensors operatively connected to the transformer, for measuring the current in two of the transformer's phases.

5. The system of claim 1, further including a voltage sensor for measuring voltage applied to the drive.

6. An oil pumping apparatus, comprising:
   (a) a controller to provide a balanced three-phase signal;
   (b) a variable speed inverter, electrically connected to the controller, to provide a pulsewidth modulated electrical signal in response to the balanced three-phase signal;
   (c) a three-phase, non-gap transformer, electrically connected to the inverter to receive the pulsewidth modulated electrical signal and provide an output signal; and
   (d) a downhole electrical induction motor having a driving frequency $f_\omega$ and electrically connected to the transformer, to pump oil from an oil well in response to the output signal from the transformers;
   wherein said controller includes:
   circuitry for determining a ratio between said driving frequency $f_\omega$ and a desired chopping frequency $f_{PWM}$;
   circuitry for identifying an odd multiple of three nearest to said ratio;
   circuitry for generating a triangular signal having a frequency equal to $f_\omega$ times said odd multiple of three;
   circuitry for generating three sinusoidal signals having frequency $f_\omega$ and separated by phase differences of 120 degrees, wherein all zero-crossing points of said three sinusoidal signals occur simultaneously with zero-crossing points of said triangular signal;
   comparison circuitry for performing a sine-triangle comparison of said triangular signal and said three sinusoidal signals to generate first, second and third rectangular signals; and
   driving circuitry for selectively applying said first, second and third rectangular signals to said motor.

7. The apparatus of claim 6, wherein the controller comprises a microprocessor.

8. The apparatus of claim 6, wherein the controller comprises discrete analog circuitry.

9. The apparatus of claim 6, wherein the controller comprises discrete digital circuitry.

10. A pumping system, comprising:
    (a) an electrical induction motor having a driving frequency $f_\omega$;
    (b) one or more cables, electrically connected to the motor;
    (c) a three-phase, non-gap output transformer electrically coupled to the cables;
    (d) a variable speed inverter to provide drive signals to the transformer in response to input signals received by the inverter; and
    (e) computing circuitry utilizing vector control logic to generate the input signals to control rotation of the motor, wherein the input signals comprise three balanced rectangular signals, such that the drive signals are substantially free from any D.C. offsets;

wherein said computing circuitry comprises:

circuitry for determining a ratio between said driving frequency $f_\omega$ and a desired chopping frequency $f_{PWM}$;

circuitry for identifying an odd multiple of three nearest to said ratio;

circuitry for generating a triangular signal having a frequency equal to $f_\omega$ times said odd multiple of three;

circuitry for generating three sinusoidal signals having frequency $f_\omega$ and separated by phase differences of 120 degrees, wherein all zero-crossing points of said three sinusoidal signals occur simultaneously with zero-crossing points of said triangular signal;

comparison circuitry for performing a sine-triangle comparison of said triangular signal and said three sinusoidal signals to generate first, second and third rectangular signals; and driving circuitry for selectively applying said first, second and third rectangular signals to said motor.

11. The pumping system of claim 10, wherein the transformer includes a delta-connected primary and a wye-connected secondary.

12. The pumping system of claim 10, wherein the transformer includes a delta-connected primary and a delta-connected secondary.

* * * * *